US010638175B1

(12) United States Patent
Rutledge et al.

(10) Patent No.: US 10,638,175 B1
(45) Date of Patent: Apr. 28, 2020

(54) SYSTEM AND METHOD FOR IDENTIFYING MUTUAL AFFINITIES

(71) Applicant: Colligent, Inc., Austin, TX (US)

(72) Inventors: Shawn Rutledge, Seattle, WA (US); Sreekanth Nagarajan, Austin, TX (US); Disney Jacob, Bangalore (IN)

(73) Assignee: Affinity Answers Corporation, Austin, TX (US)

( * ) Notice: Subject to any disclaimer, the term of this patent is extended or adjusted under 35 U.S.C. 154(b) by 0 days.

(21) Appl. No.: 14/795,971

(22) Filed: Jul. 10, 2015

(51) Int. Cl.
*G06Q 30/02* (2012.01)
*H04N 21/25* (2011.01)
*H04N 21/466* (2011.01)
*H04N 21/4788* (2011.01)

(52) U.S. Cl.
CPC ....... *H04N 21/252* (2013.01); *H04N 21/4667* (2013.01); *H04N 21/4788* (2013.01); *G06Q 30/02* (2013.01)

(58) Field of Classification Search
CPC .................................................. G06Q 30/02
See application file for complete search history.

(56) References Cited

U.S. PATENT DOCUMENTS

2013/0325550 A1* 12/2013 Varghese ................ H04W 4/21
705/7.31

* cited by examiner

*Primary Examiner* — Michael H Hong (57) ABSTRACT

Systems and methods are disclosed for identifying active engagements with brands, determining mutual affinities among brands, and determining changes or trends in active engagements or mutual affinities. A base brand may be selected and all brands that have in common with the base brand at least one active participant may be presented as a mutual affinity. A mutual affinity may be used as a more accurate representation of how one brand relates to another brand. Active engagements and mutual affinities may be tracked over time to identify changes or trends.

14 Claims, 9 Drawing Sheets

| Rank | Celebrity | Type | Location | Relevance (MeQTM) | Reach (1% Fans) | Reciprocal Reach |
|---|---|---|---|---|---|---|
| 1 | Adam Schefter | TV Personalities | United States of America | 99.98 | 9.88% | 27.28% |
| 2 | Skip Bayless | TV Personalities | United States of America | 99.96 | 8.80% | 27.92% |
| 3 | LeBron James | Athletes | International | 99.94 | 10.03% | 20.60% |
| 4 | Jalen Rose | TV Personalities | United States of America | 99.92 | 7.19% | 26.82% |
| 5 | Chris Paul | Athletes | United States of America | 99.90 | 7.47% | 21.84% |
| 6 | Chris Mortensen | TV Personalities | United States of America | 99.88 | 6.23% | 27.97% |
| 7 | Trey Wingo | TV Personalities | United States of America | 99.86 | 6.15% | 28.38% |
| 8 | Chad Johnson | Athletes | United States of America | 99.83 | 7.43% | 18.51% |
| 9 | Erin Andrews | TV Personalities | United States of America | 99.81 | 6.34% | 22.49% |
| 10 | Rachel Nichols | TV Personalities | United States of America | 99.79 | 5.67% | 30.81% |

FIG. 7B

| Rank | Brand | Industry | Category | Relevance (MeQTM) | Reach (1% Fans) | Reciprocal Reach |
|---|---|---|---|---|---|---|
| 1 | Gatorade | Beverages | Sports Drinks | 99.98 | 7.39% | 12.81% |
| 2 | Nike Basketball | Sporting Goods | Basketball | 99.96 | 4.31% | 19.90% |
| 3 | Netflix | Retail | Online Retailer | 99.94 | 8.36% | 6.09% |
| 4 | Nike Jordan Shoes | Apparel & Accessories | Footwear | 99.92 | 3.61% | 19.83% |
| 5 | DirecTV | Service Provider | Television | 99.90 | 4.88% | 8.28% |
| 6 | Nike Football | Sporting Goods | Football | 99.87 | 3.20% | 21.13% |
| 7 | Gucci | Apparel & Accessories | | 99.85 | 5.36% | 8.22% |
| 8 | Nike | Apparel & Accessories | | 99.83 | 5.07% | 8.75% |
| 9 | Taco Bell | Restaurant | QSR | 99.81 | 4.44% | 6.52% |
| 10 | Under Armour | Apparel & Accessories | | 99.79 | 2.99% | 13.17% |

FIG. 7C

| Rank | Artist | Label | Genre | Relevance (MeQ(TM)) | Reach (1% Fans) | Reciprical Reach |
|---|---|---|---|---|---|---|
| 1 | Wale | Warner Brothers Re... | Hip Hop/Rap | 99.98 | 5.30% | 13.81% |
| 2 | Fabolous | Def Jam Recordings | Hip Hop/Rap | 99.96 | 4.71% | 13.77% |
| 3 | Meek Mill | Warner Brothers Re... | Hip Hop/Rap | 99.93 | 4.89% | 12.62% |
| 4 | Rick Ross | Def Jam Recordings | Hip Hop/Rap | 99.91 | 4.43% | 13.32% |
| 5 | Big Sean | Def Jam Recordings | Hip Hop/Rap | 99.89 | 4.81% | 10.46% |
| 6 | Kanye West | Roc-A-Fella Records | Hip Hop/Rap | 99.87 | 4.79% | 8.23% |
| 7 | DJ Drama | E1 Entertainment | Hip Hop/Rap | 99.84 | 3.58% | 13.34% |
| 8 | CurrenSy | Warner Brothers Re... | Hip Hop/Rap | 99.82 | 3.62% | 15.49% |
| 9 | Bun B | Asylum Records | Hip Hop/Rap | 99.80 | 3.54% | 13.38% |
| 10 | Big K.R.I.T. | Def Jam Recordings | Hip Hop/Rap | 99.78 | 3.25% | 14.55% |

FIG. 7D

| Rank | Show | Network | Genre | Relevance (MeQ(TM)) | Reach (1% Fans) | Reciprical Reach |
|---|---|---|---|---|---|---|
| 2 | SportsNation | ESPN2 | Talk Show | 99.84 | 10.09% | 16.44% |
| 5 | ESPN First Take | ESPN | Talk Show | 99.61 | 5.22% | 14.95% |
| 7 | College Gameday Football | ESPN | News/Docume... | 99.45 | 5.03% | 13.28% |
| 8 | Numbers Never Lie | ESPN2 | Talk Show | 99.37 | 3.71% | 22.98% |
| 9 | Around The Horn | ESPN | Talk Show | 99.30 | 3.55% | 21.62% |
| 10 | NBA on ESPN | ESPN | Sports | 99.22 | 3.84% | 13.59% |
| 11 | Mike & Mike in the Morning | ESPN2 | Talk Show | 99.14 | 3.67% | 15.75% |
| 12 | NBA on TNT | TNT | Sports | 99.06 | 3.34% | 13.41% |
| 15 | Sunday Night Football | NBC | Sports | 98.83 | 2.70% | 11.53% |
| 17 | NFL on Fox | FOX | Sports | 98.67 | 2.40% | 17.87% |

FIG. 7E

| Rank | Local Entity | Type | Market | Relevance (MeQTM) | Reach (% Fans) | Reciprocal Reach |
|---|---|---|---|---|---|---|
| 1 | KESN | Radio Stations | Dallas, TX | 99.97 | 2.79% | 24.88% |
| 2 | USA Today (National) | Newspapers | United States of America | 99.93 | 3.25% | 5.90% |
| 3 | WQHT | Radio Stations | New York, NY | 99.90 | 2.87% | 8.59% |
| 4 | Michigan Wolverines Football | Local Sports | Ann Arbor, MI | 99.87 | 2.54% | 13.29% |
| 5 | ESPN New York | Local Websites | New York, NY | 99.83 | 2.17% | 24.02% |
| 6 | North Carolina Tar Heels | Local Sports | Chapel Hill, NC | 99.80 | 2.12% | 22.88% |
| 7 | KSPN AM | Radio Station | Los Angeles, CA | 99.76 | 1.92% | 18.92% |
| 8 | New York Post | Newspaper | New York, NY | 99.73 | 2.14% | 6.75% |
| 9 | The Atlanta Journal-Cons... | Newspaper | Atlanta, GA | 99.70 | 1.96% | 10.63% |
| 10 | Yankee Stadium | Live Venues | New York, NY | 99.66 | 1.91% | 13.56% |

FIG. 7F

SYSTEM AND METHOD FOR IDENTIFYING MUTUAL AFFINITIES

RELATED APPLICATIONS

This application is related to U.S. patent application Ser. No. 13/411,626 entitled "Methods and Systems for Marketing", which is incorporated by reference herein.

TECHNICAL FIELD

This disclosure relates generally to the analysis and presentation of data. In particular, this disclosure relates to methods and systems for identifying when people are actively engaging brands on various networks and determining corresponding mutual affinities between these brands, and further determining trends in active engagements and mutual affinities.

BACKGROUND

To aid in understanding of the features and advantages in this disclosure, examples and scenarios described herein refer to brands, enterprises, products, services, and the like, as they pertain to marketing. As used herein, a brand may refer to any product, service, entity, person or the like that has marketing value. For example, an athlete, performer or other person may have an associated brand; a company or other enterprise may provide a service or a product, with the service or the product having a brand, etc. Thus, many celebrities may be considered a brand because of their appeal and ability to sell albums, tickets to shows, etc.; professional and amateur sports teams may be considered brands because of their appeal and ability to promote ticket sales, memorabilia sales, etc.; a television show may be a brand because of advertisers willing to pay for advertising minutes during the program; a soft drink may be a brand because people may choose to purchase the product instead of other similar soft drinks; an Internet service may be a brand because of its ability to draw advertisers or users, etc. Those skilled in the art will appreciate that the list of possible brands is not limited to these few, and it should also be noted that brands may be more inclusive or more granular. For example, Ford™ is a brand, Ford Mustang™ is also a brand, and Ford Mustang GT™ is also a brand. Similarly, the Chicago Bulls™ as a team may be considered a brand, Michael Jordan as an individual may be considered a brand, Chicago Bulls™ merchandise having Michael Jordan's name/number imprinted thereon may also be considered a brand, Nike™ shoes as a product may be considered a brand, an Air Jordan™ shoe line made by Nike™ may also be considered a brand, etc. These are intended to be non-limiting examples only, and other concepts may be included within the teachings of this disclosure.

A brand is desirable for its ability to generate revenue. Accordingly, brand owners are always looking for new ways to exploit brand recognition, revenue, etc. One way for a brand to influence its revenue is to appeal to a desired audience, also referred to as "reach." Advertisers try to maximize reach of any advertising efforts in order to increase sales for their brands. In an effort to maximize reach, advertisers generally target audiences that the advertiser hopes will associate with their brand or otherwise are likely to buy their product/service. In order to better target audiences, advertisers try to measure and analyze some portion of a population.

There are different approaches commonly used to measure and analyze populations in an effort to identify these target audiences. For example, Nielsen ratings are a well-known audience measurement system developed to determine the audience size and composition of television programming in the United States. Nielsen television ratings are gathered in one of two ways. A first way involves viewer diaries which require a target audience member to self-record viewing or listening habits. While not being bound by theory, the general idea is that by targeting various demographics, the assembled statistical models provide a rendering of the audiences of any given show, network, and programming hour. However, these types of approaches require diligence and honesty on the part of each person in the targeted audience. A second approach relies on set meters. A number of homes are provided small devices for connection to televisions. Each set meter gathers the viewing habits of the home and transmits the information to a main server through a phone line. This approach is meant to allow market researchers to study television viewing habits on a minute-by-minute basis. Ideally, this approach is supposed to allow researchers to see the exact moment viewers change channels or turn off their TV. An obvious drawback to this approach is the possibility that a user clicks on a station and then walks away, falls asleep, or otherwise does not see the television programming. Another drawback is there is no certainty that the user is paying attention to the station. The user may be talking to someone, the audio may be turned down, etc. such that the user does not hear the television programming. There also is no reason provided for why the user selected the show. Perhaps the user selected the show because of a particular character, the plot, the location or setting the show occurs, the dialogue, or some other reason.

In addition to the set meters, individual viewer reporting devices, such as people meters, are intended to allow researchers to separate household viewing information into various demographic groups.

Brand owners are looking for ways to take advantage of their brands.

SUMMARY OF THE DISCLOSURE

To overcome the shortcomings of prior approaches, systems and methods are disclosed which allow more robust analysis of active consumer engagement with brands and mutual affinities between brands, as well as determining trends related to active engagements and mutual affinities.

Systems and methods are disclosed for identifying active engagements of brands and identifying brands having a mutual affinity. Analysis of active engagements and mutual affinities may identify brands that have a preferred mutual affinity for targeting marketing efforts more effectively, including where the marketing efforts should be expended, how much effort should be expended, how efforts should be divided between various campaigns, etc. Further analysis may determine a response sensitivity to marketing campaigns, response sensitivity to positive or negative publicity, response sensitivity to events, and the like. Using these analyses, entities may discover other brands with which to associate their brand and may determine the effects of advertising on active engagements or mutual affinities. Understanding the mutual affinities between brands enables advertisers to better target a consumer group or otherwise maximize reach to key groups with efficient effort.

Embodiments disclosed herein enable audience segmenting entities and target selecting entities to identify audience segments, understand shifts in audiences and define competitive positioning. Embodiments disclosed herein enable media planning or buying entities to build media briefings, validate media plans and find keywords for purchase. Embodiments disclosed herein enable promotions or public relations entities to identify cross promotion opportunities, identify media or people to influence, identify media to offer stories, assess cast popularity for creative direction, and discover topics for future content development. Embodiments disclosed herein enable entities to identify sponsorship opportunities and assess return on current sponsorships. Embodiments disclosed herein enable ad sales entities to identify prospects, evaluate how well or how likely an advertiser fits with a product, and demonstrate value to advertisers. Embodiments disclosed herein enable programming entities to better align program schedules to target audiences. Embodiments disclosed herein enable syndication entities to identify content to acquire and identify networks to syndicate content. These and other advantages may be understood through this description.

As disclosed herein, an active participant is a person who is actively engaging a brand, and may be defined as a person who posts, comments, likes, tweets, retweets, shares/forwards, or otherwise actively engages with a website, social network, or other network-based forum in conjunction with a brand. An active participant may also be referred to as an active engager, or a fan. Examples of network-based forums include, but are not limited to, social and business networks, entertainment sites, and other neutral, independent or proprietary networks and sites. As an example, Facebook™ is a neutral site, but contains pages dedicated to people, teams, and other brands. Similarly, Twitter™ is a neutral site that allows people to tweet or retweet comments about people, events, teams, and other brands, and Instagram™ allows people to share images and videos and also allows users to comment on the images. Thus, it is possible that a person who posts a comment about an athlete on Facebook™, a person who retweets a Twitter™ tweet about the athlete, a person who comments on an image of the athlete posted on Instagram™, and other social media websites may all be considered as actively engaging with the brand associated with the athlete via those applications. It should be noted that while a person who "Likes" a website having an image, video or other visual content, hosting a blog, or otherwise containing content related to a brand is not considered to be actively engaging the brand associated with the content, that person may be considered to be actively engaging the website. In other words, only following a page, person, etc., does not meet criteria necessary to be considered as actively engaging. Thus, a person liking ESPN™ on Facebook™ might be considered actively engaging with the ESPN™ brand, but might not be considered actively engaging any particular team or athlete. In some embodiments, active engagement may be categorized based on where the active engagement occurred. For example, if a person comments on an image of an athlete wearing Brand N shoes, the active engagement may be categorized differently based on whether the person was commenting on the athlete or the shoes.

Using active engagements, embodiments disclosed herein may get a more accurate idea of what constitutes a fan base for a brand. Furthermore, embodiments may determine mutual affinities between brands. For purposes of this disclosure, a mutual affinity may be defined as an association between two brands based on the active engagements of both brands by a common group of people. In other words, a mutual affinity between two brands may be defined as an association based on a set of people in which each person considered to be actively engaging with a first brand is also actively engaging with a second brand. Thus, if a person is actively engaging Brand A sports drink and is also actively engaging Brand B musician, the person is an active participant and represents a mutual affinity between Brand A sports drink and Brand B musician. It should be noted that the person does not need to be actively engaging each brand using the same social network. For example, a person may be actively engaging an athlete via Facebook™ and actively engaging a sports drink via Twitter™, and embodiments disclosed herein may determine a mutual affinity between the athlete and the sports drink.

The strength of a mutual affinity may be determined by the size and statistical significance of the common fans as a share of the respective brand fans. It should be noted that embodiments disclosed herein are able to gather information from hundreds of sources regarding millions of people actively engaging thousands of brands, and then analyze this data to determine thousands of mutual affinities (including mutual affinities which involve only a single active participant), even in the cases in which there might not be a known mutual affinity or even a connection between two brands, and independent of any demographic. Embodiments may also be able to better quantify any known affinities. Those skilled in the art will appreciate the fact that embodiments may also determine a lack of mutual affinity between two brands. In particular, determining a mutual affinity between A and B may include determining a set of people who are fans of both A and B, fans of just A, fans of just B, and fans of neither A nor B.

In one broad respect, embodiments may be directed to a system for identifying active participants, active engagements, or mutual affinities. A system may comprise a first computer communicatively coupled to a network and configured to obtain data corresponding to a first plurality of active engagements associated with a first brand, a second computer communicatively coupled to the network and configured to obtain data corresponding to a second plurality of active engagements associated with a second brand, and a third computer operatively coupled to the first computer and the second computer and configured to compare the data corresponding to the first plurality of active engagements with the data corresponding to the second plurality of active engagements to determine a set of users actively engaging the first brand and the second brand, a set of users actively engaging the first brand but not the second brand, a set of users actively engaging the second brand but not the first brand, and a set of users not actively engaging either brand. In one respect, the system may be configured to store a set of data corresponding to the first plurality of active engagements. Comparing a first plurality of active engagements with a second plurality of active engagements may involve comparing stored active engagements with new active engagements. A system may be further configured to determine a change in the set of users actively engaging the first brand and the second brand. In one respect, a system may be further configured to plot a plurality of sets of users actively engaging the first brand and one or more other brands. The first computer may communicate with a plurality of data sources to obtain data corresponding to the first plurality of active engagements associated with the first brand. The network may include a social network. The system may be further configured to provide a recommendation for allocating resources based on one or more of the mutual affinity between the first brand and the second brand or the trend in mutual affinity between the first brand and the second brand.

The system may be configured to filter a plurality of active engagements associated with a brand.

In another broad respect, embodiments may be directed to a system for determining mutual affinities between a first brand and a second brand. The system may comprise a processor, a memory operatively coupled to the processor, the memory storing a set of instructions executable by the processor for communicating via a network. The system may be configured to: obtain a set of active engagements for a plurality of brands; for each brand, determine a set of users actively engaging that brand; and compare a first set of users actively engaging a first brand of the plurality of brands with a second set of users actively engaging a second brand of the plurality of brands to determine a set of users actively engaging the first brand and the second brand. The system may have a first computer configured to monitor a first social networking site to determine a first set of active engagements and a second computer configured to monitor a second social networking site to determine a second set of active engagements. The first computer, the second computer, or a third computer may analyze the two sets of data to determine a set of people actively engaging the first brand or the second brand, and may further determine a mutual affinity between the two brands. In one respect, the system is configured to determine a change in the set of users actively engaging the first brand and the second brand to determine a trend in mutual affinity between the first brand and the second brand. In one respect, the system is further configured to provide a recommendation for allocating resources based on one or more of the mutual affinity between the first brand and the second brand or the trend in mutual affinity between the first brand and the second brand.

DETAILED DESCRIPTION OF THE DISCLOSURE

Turning now to a more detailed description, certain specific details are set forth in order to provide a thorough understanding of various embodiments of the disclosure. However, upon reviewing this disclosure, one skilled in the art will understand that the disclosure may be practiced without many of these details. In other instances, some well-known structures and methods associated with the Internet, online social networks, computers, and network systems have not been described in detail to avoid unnecessarily obscuring the descriptions of the embodiments.

Various embodiments can include a system hosted by one or more servers and which can be remotely accessible over a global network (e.g., the Internet), a local area network, or wide area network, or a combination thereof by a plurality of clients. A server can comprise one or more computers (or other devices) or systems capable of processing instructions and information, storing data and information for access and transfer and communicating over the network.

Figure 1:
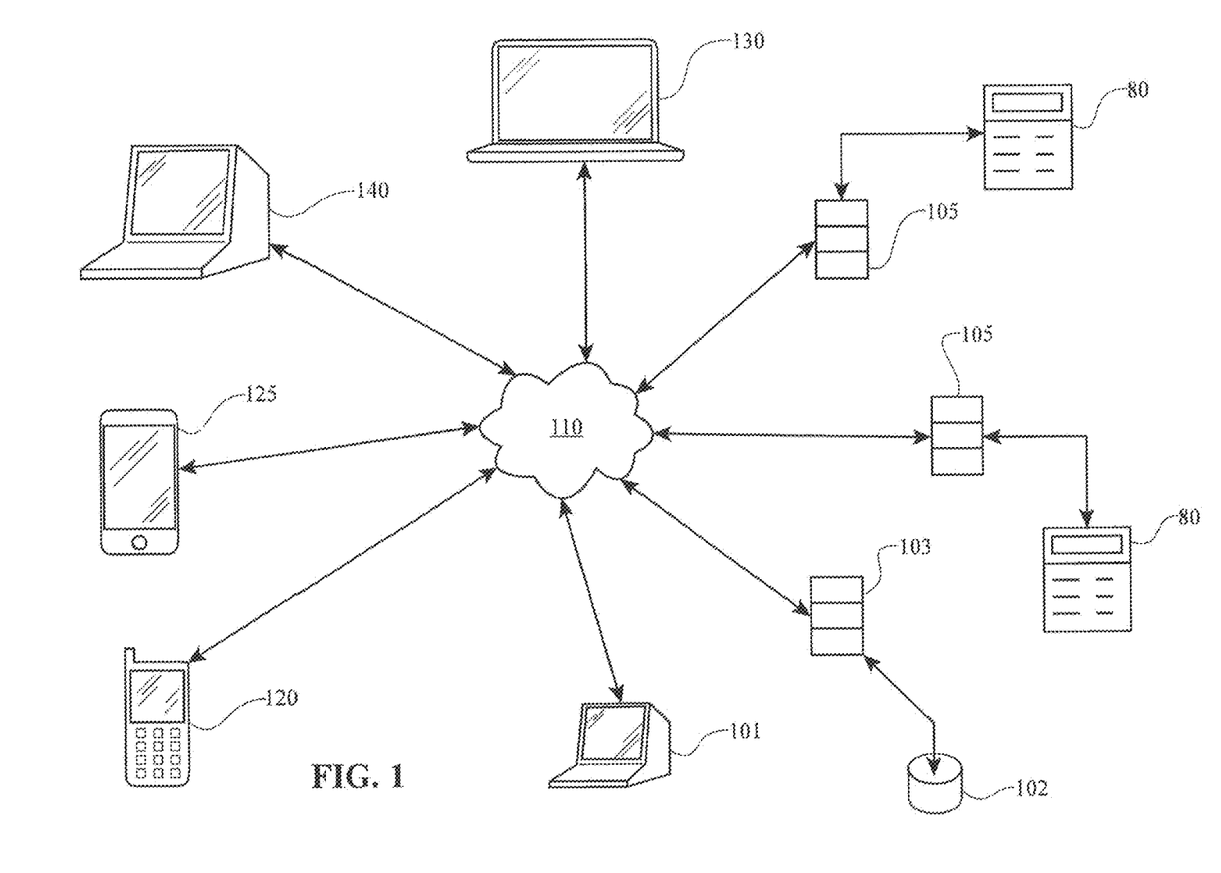
FIG. 1 depicts a block level diagram of one embodiment of a system useful for identifying active engagements or mutual affinities.

FIG. 1 depicts a block level diagram of one embodiment of a system configurable for identifying active engagements, identifying mutual affinities, determining trends in active engagements and determining trends in mutual affinities. Users of computing devices, including desktop devices 140 as well as mobile computing devices such as tablets 125, smartphones 120, laptops 130, etc., may actively engage via network 110 with any number of websites, networks, or other applications 80 hosted by server computers 105. This information may be gathered, received or otherwise obtained to identify active engagements and determine mutual affinities. The information obtained may be associated with hundreds, thousands, or more brands. Systems disclosed herein may continually obtain information from host servers, analyze the information and store the information in a memory. Additionally, systems may periodically analyze stored information with new information to identify additional active engagements, determine trends in active engagements, determine additional mutual affinities, and determine trends in mutual affinities. This information may be presented to entities such as clients, managers, researchers, marketing groups and others in a dynamic format for better understanding of how the active participants are reacting to events and campaigns associated with various brands. Furthermore, embodiments may provide some guidance for targeting audiences, sponsors, or identifying possible business partners.

People may actively engage brands at various networks, and data presented to a user may be the result of obtaining information and analyzing information related to people actively engaging brands. Data obtained from these networks, along with instructions for carrying out various methods described herein, can be stored on and be executed on one or more servers 103, including remote servers or storage 102. A user can use a general purpose computer 101 to communicate with the one or more servers 103. In some embodiments of the present disclosure, a user of computer 101 can interact with a graphical user interface ("GUI") of the present disclosure, which may reside on a server 103, either locally or remotely.

Figure 2:
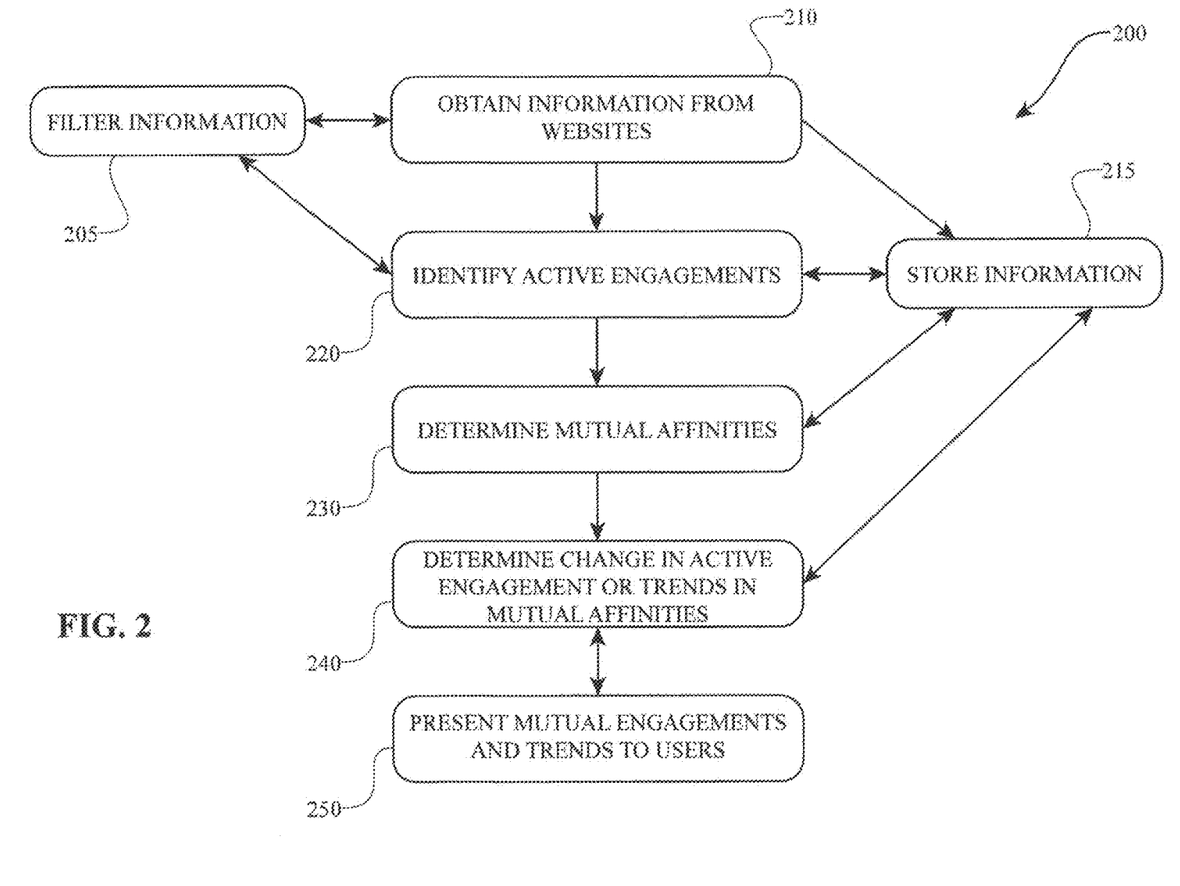
FIG. 2 depicts a flow diagram, illustrating one method for identifying active engagements, determining mutual affinities, determining changes or trends in active engagements, or determining changes or trends in mutual affinities.

Turning now to FIG. 2, one embodiment of a method is disclosed for obtaining and analyzing information related to active participants, determining active engagement of brands, determining mutual affinities, determining trends in active participation, or determining trends in mutual affinities.

In some embodiments, method 200 may include a first step 210 of obtaining information from a plurality of websites, networks, applications, or other sources 80 hosted by server computers 105. Obtaining information 202 may be accomplished by a single device communicating with each of any number ("N") of servers 105 hosting a social network, or obtaining may be accomplished by N servers, modules or applications, each being dedicated to monitoring a single social network to gather information and sending the information to a central computer or network of computers. Obtaining information may be performed periodically, such as hourly, daily, weekly etc., or may be performed continually. Gathering information may include identifying all publicly available information about each person actively engaging with each brand on the social network Regardless of how information is obtained, not all people interacting with a particular social network are deemed to be actively engaging with the social network. Furthermore, it is possible that not everybody actively engaging with the social network should be included in a pool of people actively engaging with a brand. For example, social networks often allow users to opt out of making public, disclosed information about themselves. In these cases, no other information is obtained and the person is not included in the pool of people actively engaging with the social network. Similarly, a social network may prevent minors' information from being made public even if the minor did not specifically opt out, and in these cases, embodiments may be configured such that the (minor) person would not be tracked as a person actively engaging with that social network. Information about other users might not be tracked for other reasons. In some embodiments, information may be filtered and checked to ensure the information includes publicly available information, or may be otherwise processed to ensure the information is relevant. In some embodiments, filtering 205 may be performed to identify all publicly available information about a person actively engaging with the social network. In some embodiments, identifying all publicly available information about a person may ensure that any pool of active participants includes only relevant engagements that do not violate privacy, security or other regulations.

Information may be stored for analysis at a later time or date. Storing may comprise storing raw data as it was received, or may involve organizing information into a desired data structure. In step 215, the information may be stored in a database or other data structure in a memory device or system.

As mentioned above, within any group of people interacting with a social network, a percentage will actively engage in discussions, blogs, tweets, comments, etc., by posting comments, liking (or disliking) comments, liking (or disliking) visual content (e.g., images, videos, GIFs, animations, etc.) or articles, tweeting or retweeting posts, sharing, etc. Methods disclosed herein may identify active engagements on social networks and associate the active engagements with a brand. Systems disclosed herein may "crawl" or otherwise communicate with these applications to gather or receive information related to active engagements, and in step 220 the information may be analyzed to identify a pool of people (also referred to as the active participants) who are actively engaging at least one brand at one or more websites, networks or applications.

Data associated with people actively engaging with a first brand via a first social network may be analyzed to determine if any of the people are actively engaging other brands at the same social network or other social networks. If so, a mutual affinity exists between the two brands. In other words, if, for example, a user posts a comment on a social network about a blog for Brand N running shoe and also retweets an image for Pop Singer Y, embodiments may determine that a mutual affinity exists between Brand N running shoe and Pop Singer Y. In step 230, active engagements are compared with other active engagements to determine mutual affinities between brands by identifying people who are actively engaging with the same brands. A comparison may be performed by a single computer that receives data from multiple sources, or a system of computing devices may communicate information such that a portion of the comparison can occur at each computing device or a subset of the computing devices.

Embodiments disclosed herein may search information stored in memory and information received from one or more servers to determine mutual affinities for thousands of brands. Advantageously, embodiments may continually determine mutual affinities, determine changes in active engagements, determine changes in mutual affinities and determine trends in mutual affinities. Information may be stored for a plurality of social networks and applications to identify mutual affinities. In step 240, a computing system may perform analyses to determine changes in the number of active participants as well as changes in mutual affinities between brands. In some embodiments, the information that is received from N applications may be analyzed to associate a physical location, demographic information, or other information for each active participant, which may be helpful for targeting later on. Some information about a person may be gleaned from other information. For example, if a person consistently comments on television shows, performances or events that only air or occur near Austin, Tex., that person may be identified as having an association with Austin, Tex. even if the person does not list Austin, Tex. on his/her public profile(s).

The results of any analysis may be presented to a user. In step 250, the information may be presented to researchers, marketing groups, or other third parties, by sending the information to the third parties or by providing a graphical user interface that (GUI) that allows third parties to view the information in various formats. Information about mutual affinities may be presented to a user using different formats. For example, in some embodiments, the information may be presented graphically as two areas including an overlapping area, in which the overlapping area represents the mutual affinity. Each area graphically represented in a depiction of a mutual affinity between two brands may have a size representative of the number of people in the pool of people actively engaging with that brand.

Method 200 may involve the information being obtained from the application(s) and sent back to a central server. Filtering and analyzing may be performed by a central server 103, or some portion of the filtering and analyzing may be performed by each server, module, application or source gathering the information. For example, in some embodiments, a first application monitors a first social network to gather information about who is actively engaging with that social network and also filters out information relating to minors or people who have opted out of sharing their profile information, and a second application monitors a second social network to gather information about who is actively engaging with that social network and also filters out information relating to minors or people who have opted out of sharing their profile information.

Figure 3:
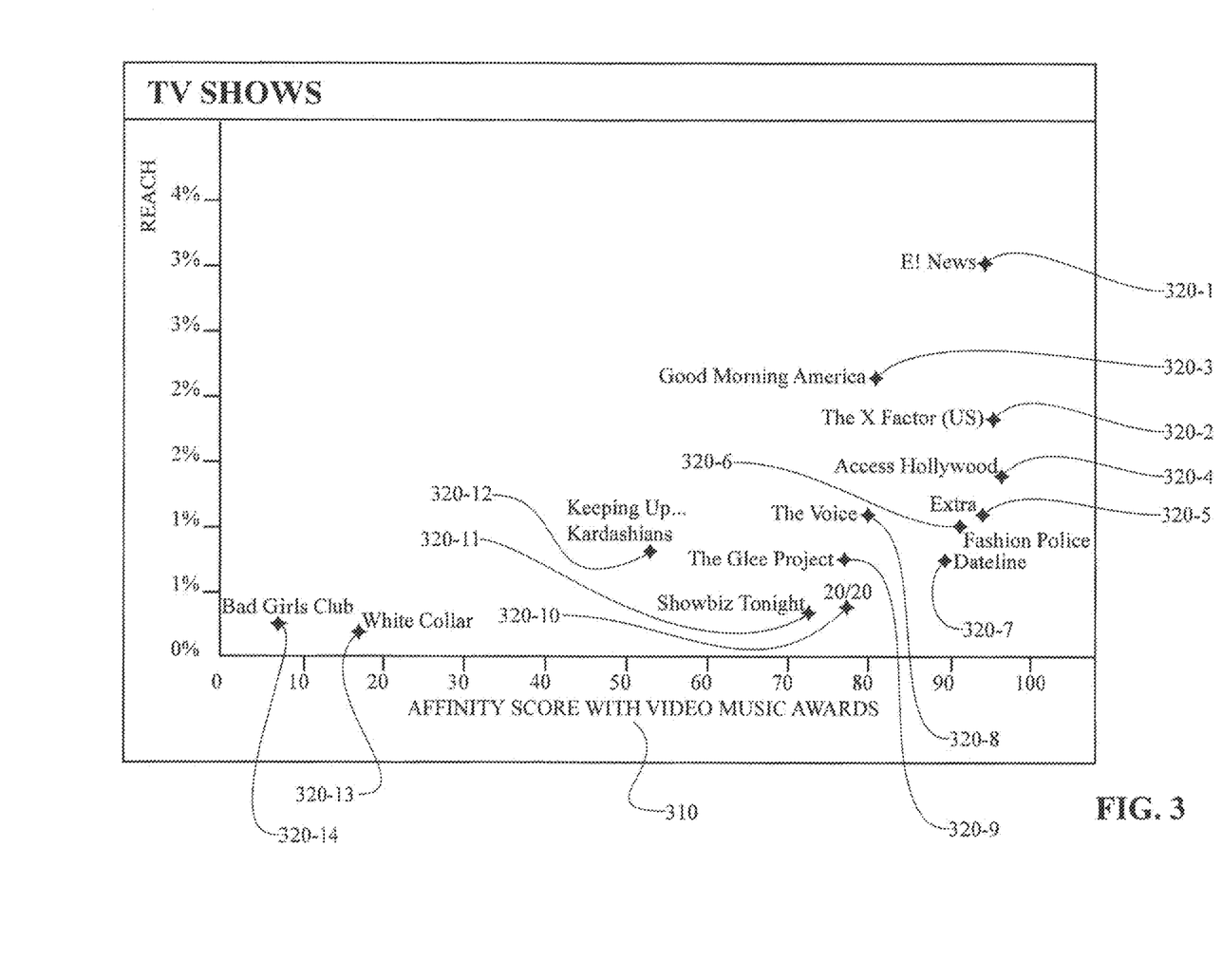
FIG. 3 depicts one possible graphical representation of mutual affinities between a target brand and several other brands.

Presentation of active engagements or mutual affinities may itself allow users to better understand relationships among brands. FIG. 3 depicts one possible graphical representation of mutual affinities between a base brand 310 (e.g., a music award show) and several other brands 320-1 to 320-14 (e.g., television shows). Representing brands 320-1 to 320-14 that have a mutual affinity with target brand 310 allows users to see how each brand 320 compares with other brands 320. In some embodiments, data may be presented to a user in various formats. For example, a shape may be used to indicate the number of active participants. "Mousing over" a shape may trigger the system to provide additional information, such as ranking, percentage or some other statistic.

Figure 4:
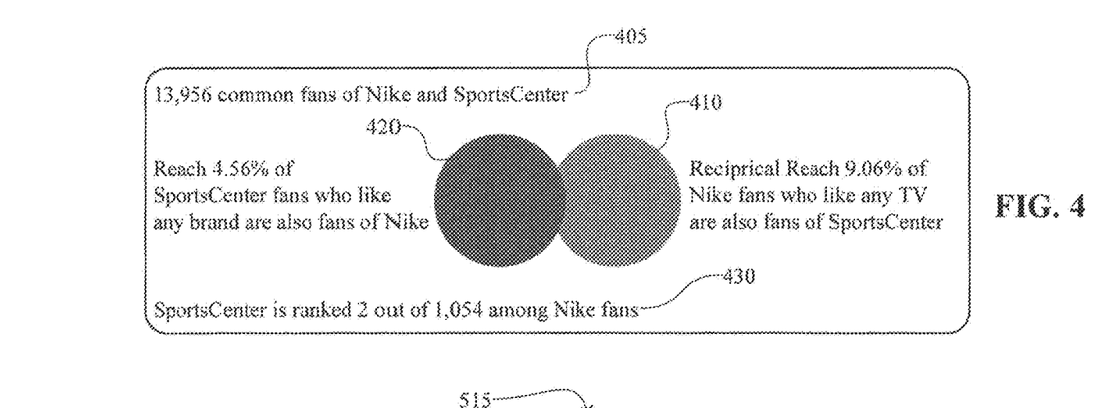
FIG. 4 depicts a screenshot, illustrating one method for presenting information to a user about a mutual affinity between two brands.

For a greater understanding of concepts and embodiments disclosed herein, an example of a mutual affinity is provided. In this example, a first brand may be a product and a second brand may be a television program. As depicted in FIG. 4, information 405 indicates that there are 13,956 common fans actively engaging a first brand (i.e., SportsCenter™) and a second brand (i.e., Nike™) on one or more social networks (e.g., Facebook™, Twitter", etc). In this example, a first shape 410 having a first color or shading may be used to indicate that 9.06% of the second brand (i.e., Nike™ fans) who like any TV show are also fans of the first brand (i.e., SportsCenter"), while a second shape 420 having a different color or shading may be used to indicate that only 4.56% of the fans of the first brand (i.e., SportsCenter™) who like any brand of sports apparel are also fans of the second brand (i.e., Nike™). Other information may be provided as well. For example, data may include the number of fans of both the first brand and the second brand, the number of fans of just the first brand (not the second brand), the number of fans of the second brand (not the first brand), and the number of people who are fans of any TV show or any brand of apparel but who are not fans of neither the first brand or the second brand. As an example, FIG. 4, shows information 430 indicating that SportsCenter™ is ranked second out of 1,054 brands in terms of mutual affinity with Nike™. Furthermore, and as illustrated in FIG. 4, information may be presented as a number 405, a percentage 410, 420, as a percentile 430, graphically or in any format that adequately conveys information to a user about mutual affinities between brands.

As mentioned above, embodiments disclosed herein may determine mutual affinities between brands. Depicting a mutual affinity between two brands may be helpful for deciding if a brand is suitable for a company to expend resource (e.g., time, resources or money) to sponsor an athlete, for an athlete to endorse a company, etc. A comparison of several possible brands may be beneficial. Embodiments disclosed herein may depict multiple mutual affinities relative to a single brand. In some embodiments, multiple affinities are presented simultaneously, for example in a format in which each mutual affinity is represented graphically. A first brand (e.g., Brand X) is selected as a base brand (or simply a "base"). A population of target brands (which may include every brand) that has a mutual affinity with the base brand may be presented on the same report as target brands (or simply "targets").

Figure 5:
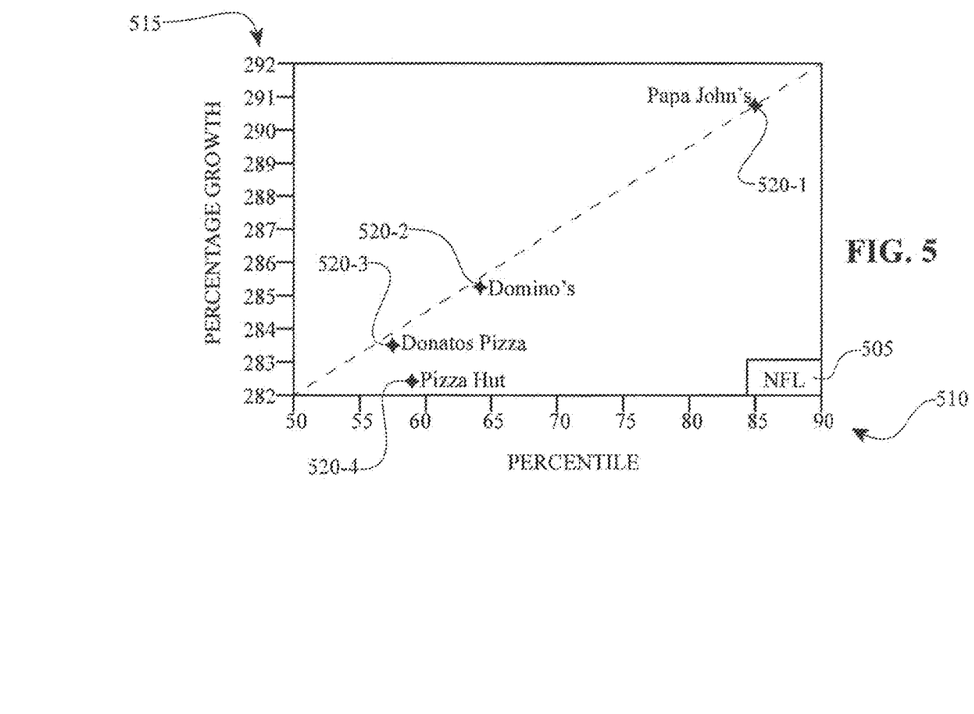
FIG. 5 depicts one embodiment of a GUI, indicating mutual affinities between a base brand and other brands.

FIG. 5 depicts one embodiment of a GUI, indicating mutual affinities between a base brand 550 (i.e., the NFL™) and other target brands (i.e., pizza brands Papa John's™ 520-1, Domino's™ 520-2, Pizza Hut™ 520-4 and Donatos™ pizza 520-3). Note that in this example, only pizza brands above the 50$^{th}$ percentile are shown, and corresponding to a percentage growth of at least 280%. Those skilled in the art will appreciate that the ability to select only certain categories (e.g., pizza brands), only certain percentile ranges (e.g., greater than 50$^{th}$ percentile), etc., allows users to analyze affects and study trends with greater granularity.

In this scenario, a first brand is selected by a user to be base brand 505, and other brands are target brands 520-1 to 520-4 which have a mutual affinity with base brand 505. The position of target brands 520-1 to 520-4 along the x-axis 510 may indicate the percentile of target brands 520-1 to 520-4 in relation to base brand 505. The position of target brands 520-1 to 520-4 along the y-axis 515 may indicate a percentage or percentage growth indicating how much the fans of the base brand 505 are fans of target brands 520-1 to 520-4. Thus, if the people who are actively engaging base brand 505 are also actively engaging any of target brands 520-1 to 520-4, a mutual affinity occurs and a representation of the mutual affinity may be displayed.

Line 530 may overlay the representation of the mutual affinities and represent a preferred mutual affinity, in which the mutual affinity between two brands is generally beneficial to both brands. If more people than who are actively engaging base brand 505 are also actively engaging a target brand 520, the ratio may be displayed above line 530. If fewer people than who are actively engaging base brand 505 are also actively engaging a target brand 520, the ratio may be displayed below line 530. In other words, if the ratio of the number of people who are fans of base brand 505 is one-sided, the representation may be indicated on either side of line 530, depending on the ratio.

As depicted in FIG. 5, the position of a pizza brand along the x-axis may represent active participants who enjoy the NFL™, expressed as a percentile. Thus, the more a representation of a mutual affinity is shifted to the right, it can be assumed the brand of pizza has a higher percentile of people engaging the NFL™. The position of a brand along the Y-axis may represent the percentage of active participants who enjoy another brand of pizza and reciprocate with the NFL™. It should be noted that in this scenario, the values on the y-axis represent growth percentages, and only pizza brands having a growth percentage exceeding 280% are depicted, although other ranges or criteria are possible.

Information presented to a user may enable the user to understand mutual affinities with respect to multiple brands, and further allows the user to visualize the mutual affinities at a single point in time (a "snapshot") or as dynamic relationships. In some embodiments, a mutual affinity may be presented as a shape (e.g., a circle, sphere, square, bubble, etc.), in which a larger shape represents a greater number of people actively engaging the other brand and the proximity between any brand and the base brand is indicative of the mutual affinity between the base brand and that particular brand. In some embodiments, mutual affinities may be animated to further highlight changes or trends in mutual affinities. Thus, if a shape is displayed on a GUI and the shape appears to be getting larger, that may indicate an increase in the number of people actively engaging either or both brands. Other ways to show trends may include charts, trend lines, graphs, or the like.

Figure 6:
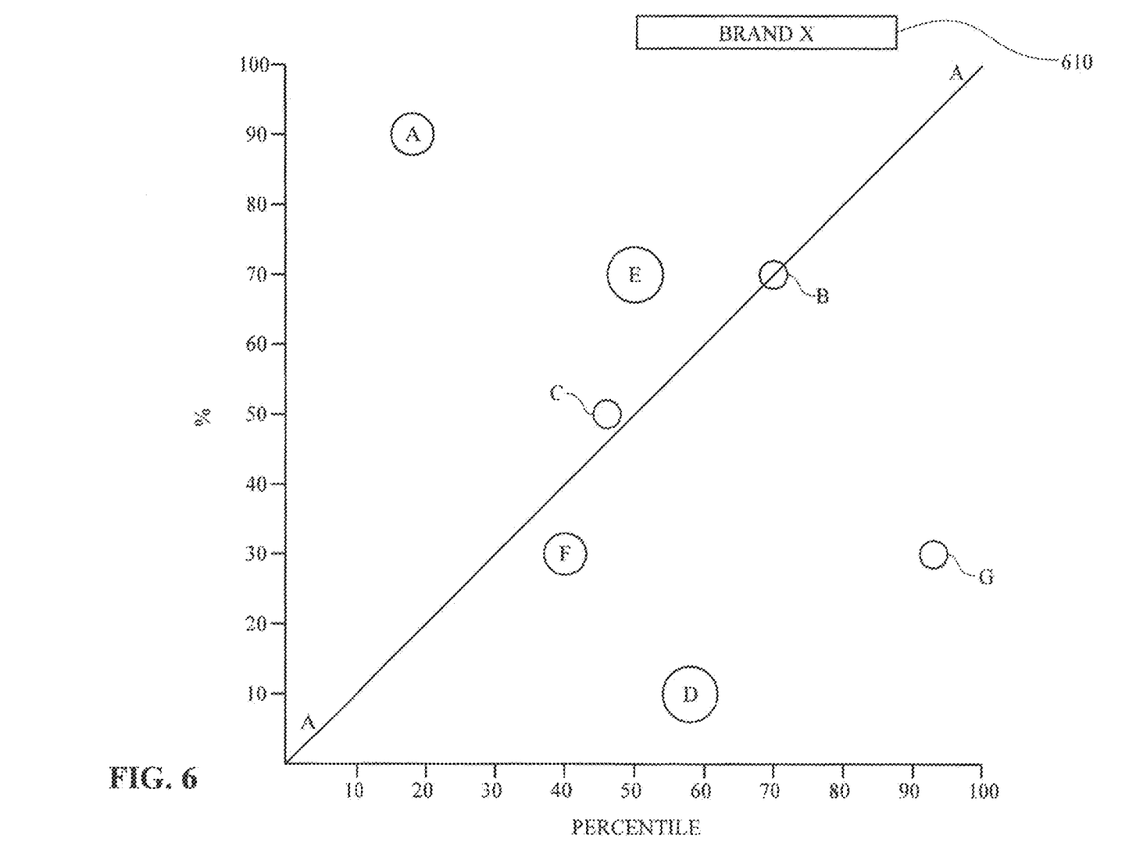
FIG. 6 depicts a screen shot of a GUI, illustrating one method for displaying information to a user.

The presentation of brands on a GUI may illustrate the relationships between a brand and the target brand, as well as the relationships among other target brands. FIG. 6 depicts Target Brands A-G in relation to Base Brand 610.

Referring to the x-axis, Brand G is the brand with the highest percentile, which means that of brands A-G having a mutual affinity with Base Brand X, Brand G is the highest percentile of Brands A-G. Brand A is the brand with the lowest percentile, meaning that of all brands having a mutual affinity with Brand X, Brand A is the lowest percentile of Brands A-G.

Referring to the y-axis, Brand A is the brand with the highest percentage of fans who also are fans of Brand X, and Brand D is the brand with the lowest percentage of fans who are fans of Brand X.

FIG. 6 illustrates that although Brands A-G may all have mutual affinities with Brand X, there are variations in affinities. For example, analyzing the mutual affinity between Brand G and Brand X may reveal that although fans of Brand G are also fans of Brand X, fans of Brand X are not as likely to be fans of Brand G. In contrast, analyzing the mutual affinity between Brand A and Brand X may reveal that fans of Brand A are not really fans of Brand X, but fans of Brand X are big fans of Brand A. These are one-sided relationships. Also in FIG. 6, Brands B, C and F are depicted on or near the line A-A, illustrating that a proportional percentage of people actively engaging Brand X are actively engaging Brands B, C and F. This illustrates a more symbiotic relationship between Brand X and Brands B, C and F.

As can be seen from FIG. 6, the size of an object representing a mutual affinity and the position of that object may be valuable for determining how to allocate resources for an advertising campaign, sponsoring a concert tour, being a spokesperson for a product, etc. For example, based on the graphical representation depicted in FIG. 6, investing in advertising or sponsorships with Brand B, Brand C or Brand F may be very beneficial (with Brand F representing a larger possible pool of people to target). However, based on an analysis resulting in the graphical representation depicted in FIG. 6, investing in Brands A or Brand E may be beneficial to Brand A or Brand E but may not be desirable for Brand X because, although the people of Brand X already like Brand A or Brand E, the reverse is not true. Furthermore, based on an analysis resulting in the graphical representation depicted in FIG. 6, investing in Brand D or Brand G may not be necessary because the pool of people in Brand D or Brand G already enjoy Brand X. Those skilled in the art will appreciate that embodiments disclosed herein provide information necessary to more reliably invest marketing efforts. For example, a decision may be made to not invest any effort regarding Brands A, E, D and G, a decision may be made to expend more efforts regarding Brand F than Brands C or B, a decision may be made to spend more effort with Brands B and D due to their proximity to Brand X, and so forth.

Figure 7A:
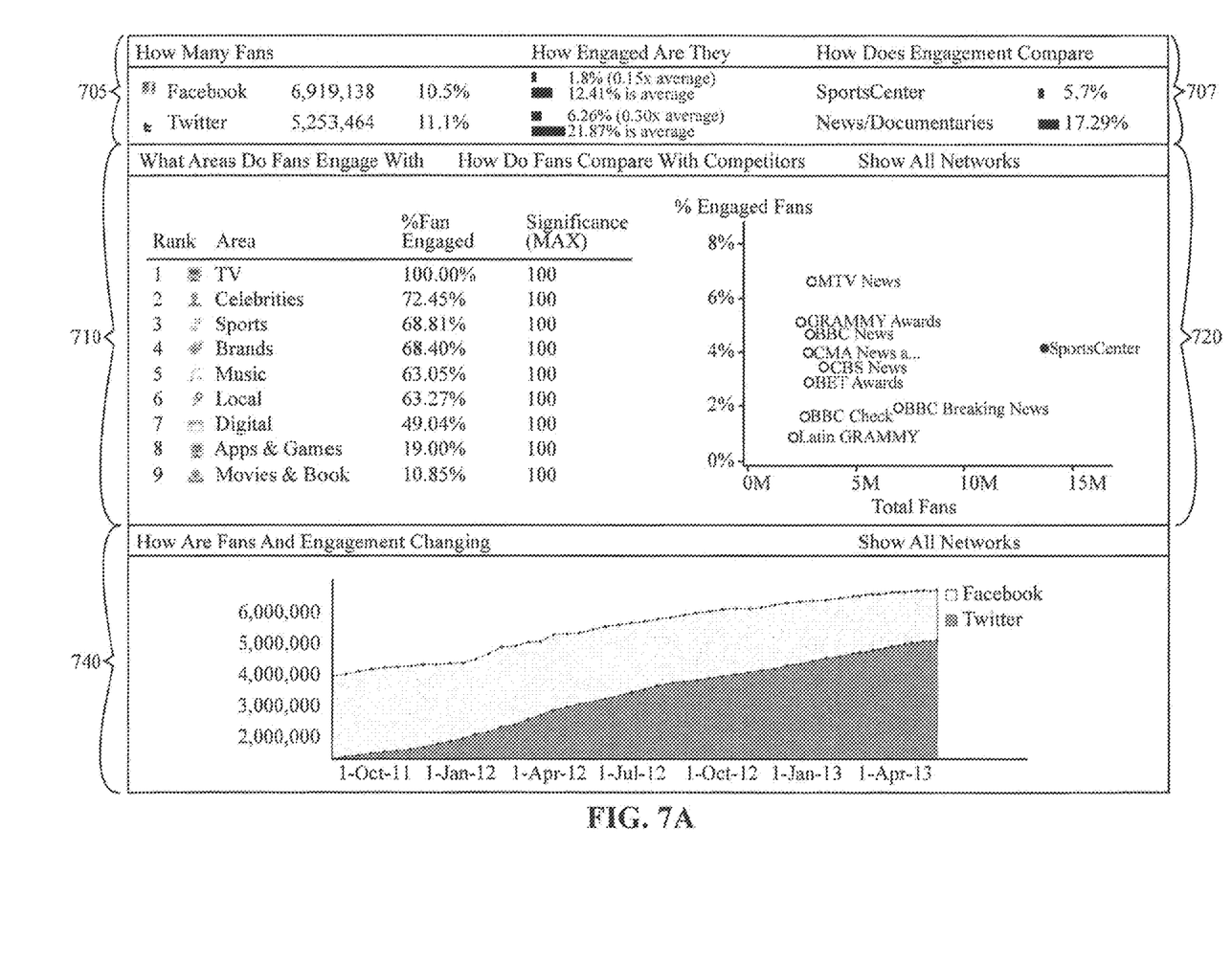
FIGS. 7A-7F depict screenshots of a GUI, illustrating ways to present data tailored to who will be accessing the data.

Other analyses may be performed. FIGS. 7A-7E depict screenshots of a GUI, illustrating ways to analyze and present data to users. Those skilled in the art will appreciate that the way data is presented may depend on who will be using the data. For example, FIG. 7A may be presented to help a user understand an audience. As depicted in FIG. 7A, active engagements may be analyzed to determine on which social networks 705 the fans are engaging a brand. In this example, out of approximately 7 million active participants on Facebook™, 1.87% are engaged, whereas out of approximately 5.2 million active participants on Twitter™, 6.25% are engaged. Chart 705 may further include information about the average number of active participants, the median number of active engagements, or other data.

FIG. 7A may also include chart or graph 707 depicting how engagement compares between a first brand (e.g., SportsCenter™) and other brands in that area (e.g., News/Documentaries).

Also in FIG. 7A, an analysis may determine areas that fans engage. For example, chart 710 depicts nine areas that fans engage, including television, celebrities, sports, brands, music, local, digital, apps and games, and movies and books.

FIG. 7A may also include chart or graph 720 depicting how fans may compare with competitors. In this example, SportsCenter™ is being compared against other television shows.

A GUI may also include chart or graph depicting changes in how engagements are changing. As depicted in FIG. 7A, graph 740 shows fans (i.e., active engagements) of a brand for two social networks (i.e., Facebook™ and Twitter™). Graph 740 may allow users to see how quickly a brand is being engaged by people, and may also allow a user to see how the brand is being engaged.

Figure 7B:
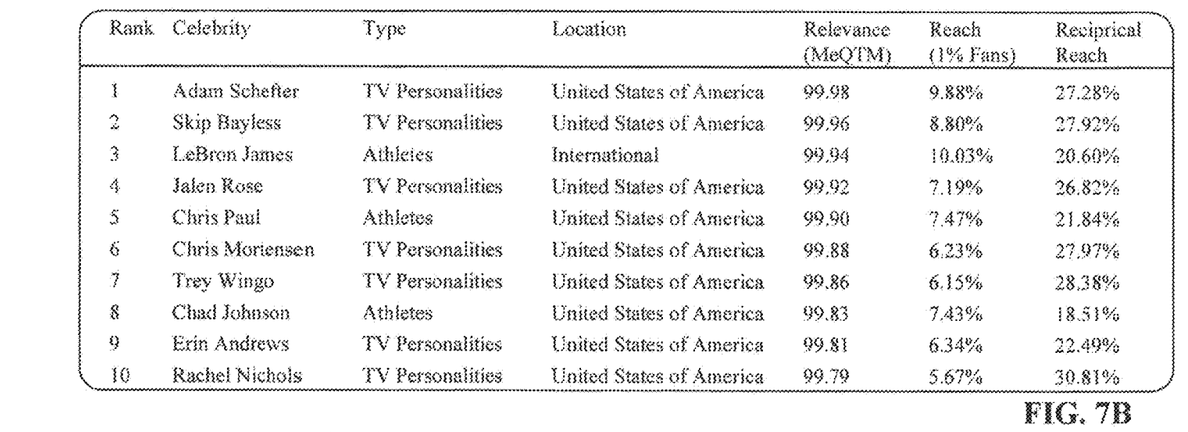
Figure 7C:
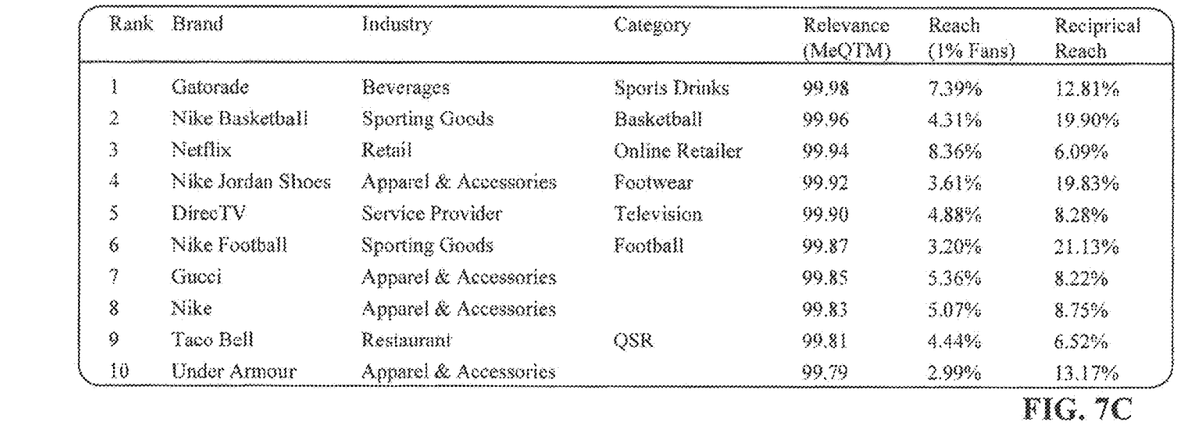
Figure 7D:
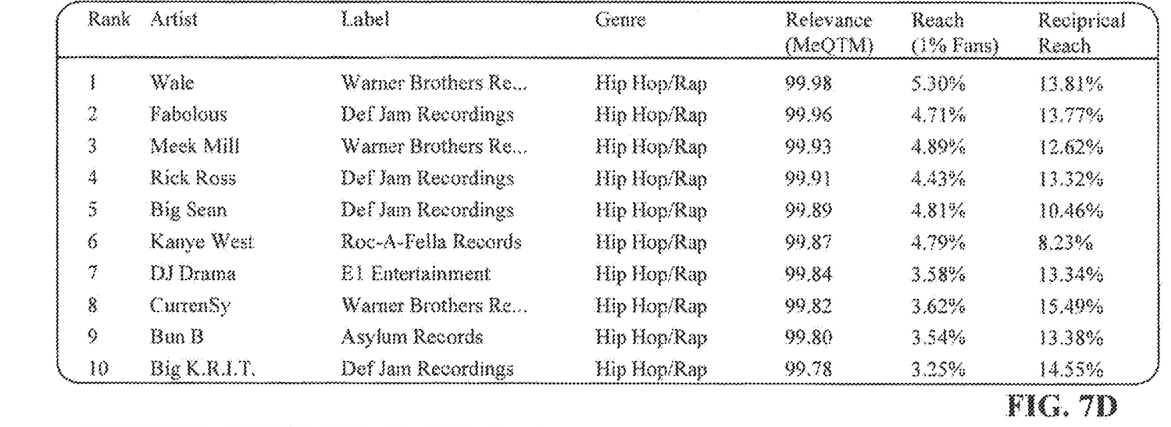

FIGS. 7B, 7C and 7D may provide additional information. For example, FIG. 7B depicts a chart listing celebrities having the highest relevance to a brand. As illustrated in FIG. 7B, a celebrity (e.g., Adam Shefter, Skip Bayless, LeBron James, etc.), being a certain type (e.g., TV personality, athlete, etc.,), associated with an area or region (e.g., the United States, International, etc.,) may have a determined relevance (displayed here as a Mutual Engagement Quotient or MeQ™), a reach (in terms of % fans), and a reciprocal reach. Thus, continuing with the example of FIG. 7A, analysis of active engagements and mutual affinities of SportsCenter™ may reveal that fans of Adam Shefter have the highest mutual affinity with SportsCenter™, even though the show has the highest reach among fans of LeBron James, and SportsCenter™ has the highest reciprocal reach among fans of Rachel Nichols. FIG. 7B may allow a network to determine celebrities to invite onto the show or otherwise highlight in an effort to gain popularity with more fans.

Similarly, FIG. 7C depicts a chart listing products having the highest relevance to a brand (e.g., SportsCenter™). FIG. 7C may be presented to a user to find suitable brands, industries, or categories of products for partnerships and promotions.

Similarly, FIG. 7D depicts a chart listing sports programs, television shows, and other sports-related media having the highest relevance to a brand (e.g., SportsCenter™). FIG. 7D may be presented to a user to find opportunities for content partnerships with artists, stations or markets.

Figure 7E:
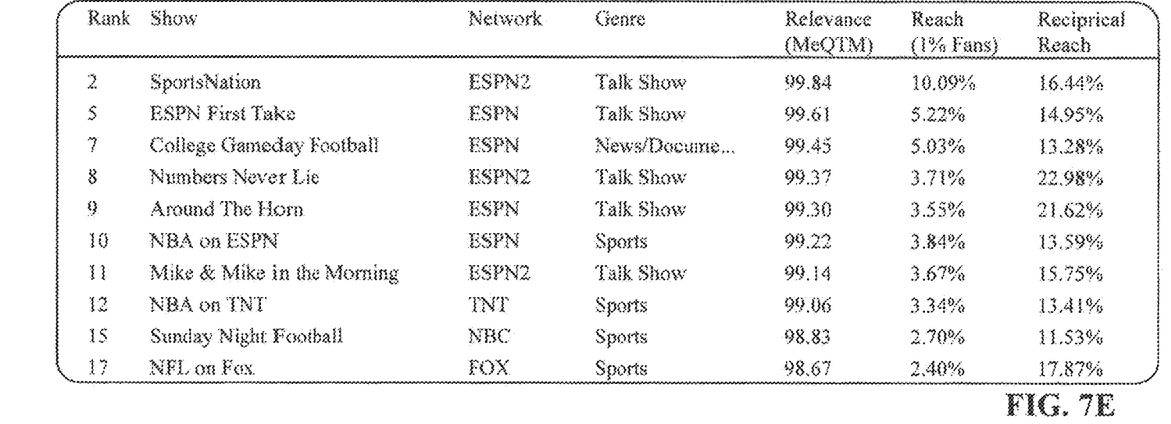

FIG. 7E depicts a chart listing sports shows, networks and genres having the highest relevance to a brand (e.g., SportsCenter™). FIG. 7E may be presented to a user to find opportunities for content partnerships with shows, networks or genres.

Figure 7F:
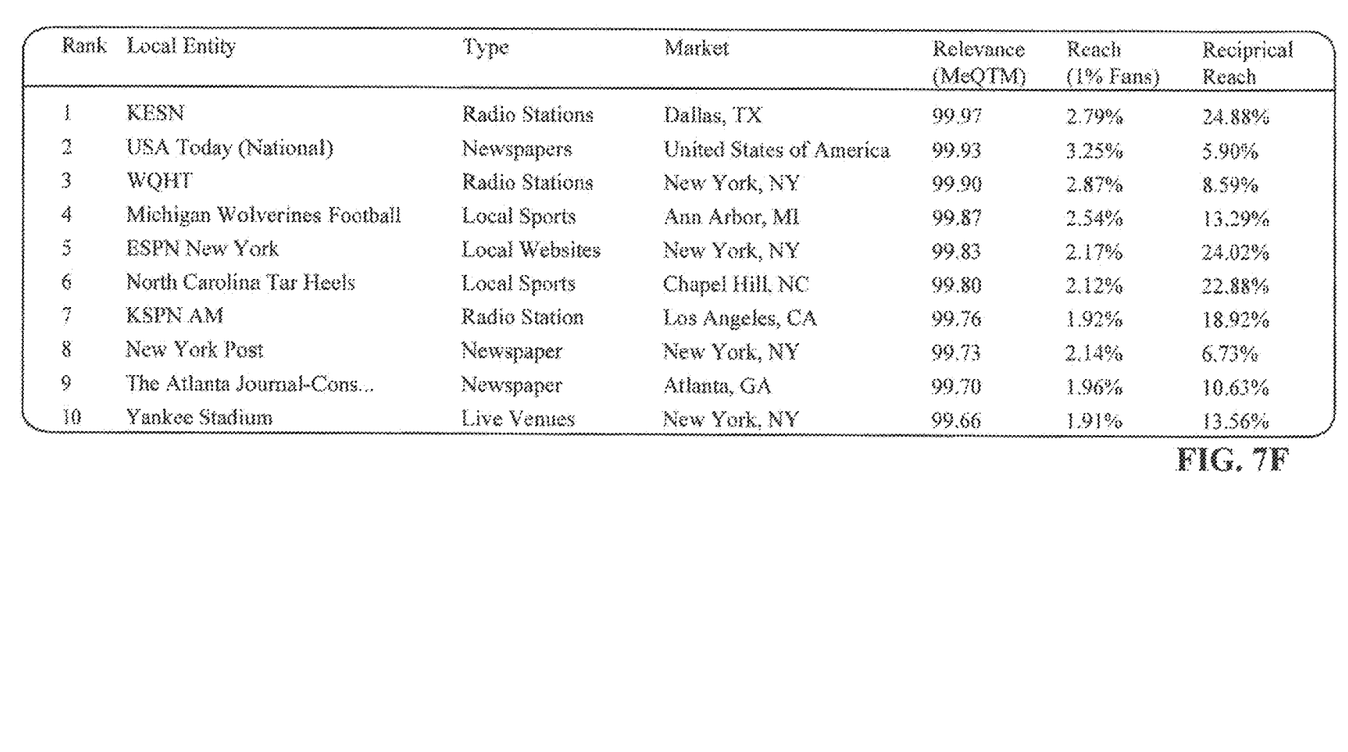

FIG. 7F depicts a chart listing stations, markets and media types having the highest relevance to a brand (e.g., SportsCenter™). FIG. 7E may be presented to a user to find opportunities for content partnerships with stations, markets or media types. Other charts and graphs may be presented to a user, and different users may be presented different views, charts or graphs best suited to their needs.

People are always looking for the new "it" thing or person, and as such, mutual affinities and pools of people actively engaging applications change over time. Thus, while a snapshot of mutual affinities for a brand may be helpful, understanding trends may provide additional advantages. A change may be the direct result of an active advertising campaign, a new spokesperson, a sponsorship of a team, event, tour, or the like, may be due to positive or negative publicity with a product, or may be due to a new brand in the market. Embodiments disclosed herein may be used to determine changes in pools and mutual affinities. Advantageously, these changes may allow advertisers to see which celebrities they want to endorse, how performances or sightings affect (positively or negatively), allow celebrities to see how much their association with a particular brand affects the pool of people engaging that brand, or other effects.

Tracking changes for a pool of people actively engaging a brand may involve determining the number of people actively engaging the brand at a first point in time and comparing that number against the number of people actively engaging the brand at a second time. Tracking changes for a pool of people actively engaging a brand may involve weighting where a person actively engages the brand, how often the person actively engages the brand, or some other factor. Advantageously, embodiments disclosed herein may be able to determine a more exact number of how many people are actively engaging a brand. Tracking changes for a pool of people actively engaging a brand may also involve analyzing how or where the pool of people are actively engaging the brand. For example, at a first time period, the majority of people actively engaging a television show may be commenting about a television character on general television blogs, but at a second time period, the majority of people may be actively engaging a website that is dedicated to the television show in which the television character appears. Even more so, mutual affinities associated with the personalities appearing in the television show may change. In the first season, a male character may have a strong mutual affinity with a product, but in the second season, a female character may have a higher mutual affinity with the product. Embodiments may track these changes to allow advertising entities to select which celebrity should be a spokesperson, what product placements should be pursued, etc.

Tracking changes in mutual affinities between brands may involve comparing the mutual affinity between a base brand and a target brand at a plurality of times. In some embodiments, tracking changes may involve tracking a change in a mutual affinity may involve comparing the mutual affinity for a base brand and a target brand at a first period against the mutual affinity for the base brand and the target brand at a second time period.

The time interval between depicting mutual affinities may depend on the brand. For example, a soft drink manufacturer may want to track the effects of an ad campaign that runs only during the Super Bowl™, whereas a luxury car manufacturer may want to track affinities over a 3-5 year period as car models are introduced or phased out.

Mutual affinities may change in various ways. For example, pools of people associated with a mutual affinity may grow larger or decrease in size, a mutual affinity may become stronger toward Brand X, or may move away from Brand X. A mutual affinity may also become more one-sided, may become more balanced, or may flip such that a bias changes from Brand X to the other brand (or vice versa).

Embodiments may be used to track changes in mutual affinities between two or more brands, illustrating how an ad campaign may affect the mutual affinities. For example, Brand X may be a soft drink manufacturer and Brand Y may be a performer sponsored by Brand X. At the start of a Brand Y's tour, there is an initial mutual affinity in which fans of Brand X are fans of Brand Y, but fans of Brand Y are not as big of fans of Brand X. As the tour progresses and more people start to associate Brand Y with Brand X, the mutual affinity may increase such that fans of Brand Y are increasingly fans of Brand X. If Brand Y does interviews, promotional stops, performs at the Super Bowl™, or otherwise is in the public eye, the number of people actively engaging with Brand Y may increase. If Brand Y is seen drinking Brand X soft drinks, the number of people actively engaging Brand Y and Brand X may increase, increasing the mutual affinity between Brand X and Brand Y. Negative publicity or other behavior may negatively affect the mutual affinity as well.

In some embodiments, graphical representations may be animated to show a more fluid change in mutual affinities. In doing so, researchers, advertising executives and the like may find it easier to understand the dynamics around sponsoring a performer to be a spokesperson for a brand, or for the performer to understand the effects of being a sponsor or spokesperson for a brand, and so forth. Animations may include, but are not limited to, increasing or decreasing the size of a bubble or other shape to reflect an increase or decrease in the number of people actively engaging the same two brands, translating a shape, changing the color of a shape, or highlighting a shape.

Going further, embodiments disclosed herein may provide insight as to how a target audience may be reached. For example, information obtained about active engagements may include information about the engagement. Information about an engagement may include what type of engagement (e.g., photo/video postings, comments, frequent comments, content "Likes", tweets, retweets, talking, a hashtag, etc.). If a brand is commonly "Liked" on Facebook™, embodiments may determine that any ad campaign should at least include Facebook™, and may recommend a campaign predominantly on Facebook™. In some embodiments, active engagements may be combined with traditional demographics. For example, embodiments may determine that there is a large number of "retweeters" associated with Austin, Tex. and may recommend a campaign based on the combination of retweeting and tailor the campaign to Austin, Tex.

Embodiments may utilize a greater population to provide a more realistic analysis of brand associations. Furthermore, instead of clumping people into predetermined demographic populations, embodiments allow people, through their interactions with brands that they enjoy, to form their own pools. Advantageously, embodiments may be able to determine mutual affinities that would not be obvious. Embodiments may further provide a more detailed understanding of the mutual affinities between brands. Analyses may provide a better understanding of the effects of advertising on a mutual affinity.

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a HD), hardware circuitry or the like, or any combination.

At least portions of the functionalities or processes described herein can be implemented in suitable computer-executable instructions. The computer-executable instructions may be stored as software code components or modules on one or more computer readable media. In one embodiment, the computer-executable instructions may include lines of complied C++, Java, HTML, or any other programming or scripting code.

As used herein, the terms "comprises," "comprising," "includes," "including," "has," "having" or any other variation thereof, are intended to cover a non-exclusive inclusion. For example, a process, process, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

We claim:

1. A system for allocating advertising resources based on mutual affinities between a first brand and a second brand, comprising:
    a first computer communicatively coupled to a network and configured to:
        communicate with a first set of computers, wherein each computer in the first set of computers is associated with a first social networking website;
        obtain, from the first set of computers, information identifying a first plurality of active engagements associated with a first brand;
    a second computer communicatively coupled to the network and configured to:
        communicate with a second set of computers, wherein each computer in the second set of computers is associated with a second social networking website;
        obtain, from the second set of computers, information identifying a second plurality of active engagements associated with a second brand; and
    a third computer operatively coupled to the first computer and the second computer and configured to:
        receive the information identifying the first plurality of active engagements associated with the first brand from the first set of computers;
        receive the information identifying a second plurality of active engagements associated with the second brand from the second set of computers;
        compare the active engagements identified in one or more of the first plurality of active engagements and the second plurality of active engagements to determine a set of users actively engaging the first brand and the second brand, wherein the set of users determines a mutual affinity between the first brand and the second brand at a first point in an advertising campaign; and
        allocate a first advertising resource to the set of users based on the mutual affinity between the first brand and the second brand:
        wherein the third computer is configured to determine a change in the mutual affinity between the first brand and the second brand at a second point in the advertising campaign and allocate a second advertising resource to the set of users based on the change in the mutual affinity between the first brand and the second brand.

2. The system of claim 1, wherein the system is configured to store the first plurality of active engagements, wherein comparing the first plurality of active engagements with the second plurality of active engagements comprises comparing the stored active engagements with the active engagements to determine the change in the mutual affinity associated with the advertising campaign.

3. The system of claim 1, wherein the system is further configured to filter the first plurality of active engagements associated with the first brand.

4. The system of claim 1, further configured to:
    obtain information identifying a third plurality of active engagements associated with a third brand;
    determine a ranking between the second brand and the third brand relative to the first brand; and
    display the second brand and the third brand based on their rankings.

5. The system of claim 1, wherein the first computer and the second computer are the same computer.

6. The system of claim 2, wherein the system is configured to determine, based on the information associated with the first plurality of active engagements and the information associated with the second plurality of active engagements, a change in the set of users actively engaging the first brand and the second brand to determine the change in the mutual affinity associated with the advertising campaign.

7. The system of claim 6, wherein the system is configured to determine a first set of users actively engaging the first brand and the second brand at the first point in advertising campaign and a second set of users actively engaging the first brand and the second brand at a second point in the advertising campaign to determine the change in the mutual affinity associated with the advertising campaign.

8. A method for allocating advertising resources based on a mutual affinity between a first brand and a second brand, comprising:
    communicating with a first set of computers, wherein each computer in the first set of computers is associated with a first social networking website;
    communicating with a second set of computers, wherein each computer in the second set of computers is associated with a second social networking website;
    obtaining, from the first set of computers and the second set of computers, information associated with a set of active engagements for a plurality of brands;
    for each brand, determining a plurality of users actively engaging that brand based on the information received from the first set of computers or and the second set of computers;
    identifying a first set of users actively engaging a first brand and a second brand of the plurality of brands, a second set of users actively engaging the first brand but not the second brand, a third set of users actively engaging the second brand but not the first brand, and a fourth set of users not actively engaging either the first brand or the second brand, wherein the first set of users determines a mutual affinity between the first brand and the second brand at a first point in an advertising campaign;
    allocating a first advertising resource to the first set of users based on the mutual affinity between the first brand and the second brand at the first point in the advertising campaign; and
    determining a change in the first set of users to determine a change in the mutual affinity between the first brand and the second brand at a second point in the advertising campaign.

9. The method of claim 8, comprising:
    storing the first plurality of active engagements obtained at the first point in the advertising campaign, wherein comparing the first plurality of active engagements with the second plurality of active engagements comprises:
   comparing the active engagements stored at the first point in the advertising campaign with the active engagements obtained at the second point in the advertising campaign to determine the change in the mutual affinity associated with the advertising campaign.

10. The method of claim 8, comprising:
   determining one or more of a change in the first set of users actively engaging the first brand and the second brand, a change in the second set of users actively engaging the first brand but not the second brand, a change in the third set of users actively engaging the second brand but not the first brand, and a change in the fourth set of users not actively engaging either the first brand or the second brand to determine the change in the mutual affinity associated with the advertising campaign.

11. The method of claim 8, further comprising:
   obtaining information associated with a third plurality of active engagements associated with a third brand of the plurality of brands;
   determining a ranking between the second brand and the third brand relative to the first brand; and
   displaying the second brand and the third brand based on their rankings.

12. A computer program product comprising a non-transitory computer readable medium storing a set of instructions executable by a processor for performing:
   communicating with a first set of computers, wherein each computer in the first set of computers is associated with a first social networking website;
   communicating with a second set of computers, wherein each computer in the second set of computers is associated with a second social networking website;
   obtaining, from the first set of computers and the second set of computers, information associated with a set of active engagements for a plurality of brands;
   for each brand, determining a plurality of users actively engaging that brand based on the information associated with the set of active engagements for the plurality of brands;
   comparing the active engagements identified in the set of active engagements to determine a plurality of sets of users, wherein each user in a first set of users has actively engaged a first brand and actively engaged a second brand, wherein each user in a second set of users has actively engaged the first brand but not the second brand, wherein each user in a third set of users has actively engaged the second brand but not the first brand, and wherein each user in a fourth set of users has not actively engaged either the first brand or the second brand, wherein the first set of users determines a mutual affinity between the first brand and the second brand at a first point in an advertising campaign;
   allocating a first advertising resource to the first set of users based on the mutual affinity between the first brand and the second brand at the first point in the advertising campaign; and
   determining a change in the first set of users to determine a change in the mutual affinity between the first brand and the second brand at a second point in the advertising campaign.

13. The computer program product of claim 12, wherein determining the change in the first set of users comprises:
   monitoring a first social networking website and a second social networking website to determine a change in the first set of users actively engaging the first brand and the second brand, a change in the second set of users actively engaging the first brand but not the second brand, a change in the third set of users actively engaging the second brand but not the first brand, or a change in the fourth set of users not actively engaging either the first brand or the second brand to determine the change in the mutual affinity associated with the advertising campaign.

14. The computer program product of claim 12, configured to:
   obtain information associated with a set of active engagements associated with a third brand;
   determine a ranking between the second brand and the third brand relative to the first brand; and
   display the second brand and the third brand based on their rankings.

* * * * *